United States Patent [19]

Yamanashi

[11] 4,148,525
[45] Apr. 10, 1979

[54] HINGE FITTING FOR A SEAT AND BACKREST

[75] Inventor: Chusaku Yamanashi, Kosai, Japan

[73] Assignees: Fuji Kiko Babushiki Kaisha, Tokyo; Ikeda Bussan Kabushiki Kaisha, Yokohama, both of Japan

[21] Appl. No.: 848,930

[22] Filed: Nov. 7, 1977

[30] Foreign Application Priority Data

Nov. 19, 1976 [JP] Japan .......................... 51-155418[U]

[51] Int. Cl.² .......................... A47C 1/025; B60N 1/02
[52] U.S. Cl. ....................................... 297/367; 16/146
[58] Field of Search ............................... 297/366–370, 297/373, 379, 355, 361, 362; 16/146

[56] References Cited

U.S. PATENT DOCUMENTS

| 3,737,946 | 6/1973 | Giuliani | 297/373 X |
| 3,953,069 | 4/1976 | Tamura et al. | 297/367 |

FOREIGN PATENT DOCUMENTS

| 1284061 | 1/1962 | France | 297/361 |
| 48-8172 | 3/1973 | Japan. | |

*Primary Examiner*—Roy D. Frazier
*Assistant Examiner*—William E. Lyddane
*Attorney, Agent, or Firm*—J. Harold Nissen

[57] ABSTRACT

A hinge fitting for seats having an adjustable backrest, comprising first and second hinge members adapted to be secured to one side of the seat and backrest, respectively, and connected pivotably to each other. Locking means normally locks the hinge members at different angles to each other, the locking means including first and second locking members normally meshing with each other in a plane, the first locking member being a toothed sector integral with the second hinge member, the second locking member being a toothed member pivoted on actuating means which in turn is pivoted on the first hinge member and adapted to be operated manually by a control lever. Restraining means cooperates with the first hinge member to restrain the locking members therebetween from being at least partly disengaged from each other in a direction perpendicular to the plane in which the locking members mesh with each other.

9 Claims, 3 Drawing Figures

HINGE FITTING FOR A SEAT AND BACKREST

BACKGROUND OF THE INVENTION

The present invention relates to a hinge fitting for seats having an adjustable backrest suitable for vehicles and more particularly to improvements in the hinge fitting.

There are some hinge fittings for car seats wherein a pair of locking members meshable with each other are adapted to lock the backrest adjustably to the seat at different desired angles. The hinge fittings have the possibility that, when the car collides sharply with an object in front of the car, for example, a passenger in the rear seat will be struck against and break the backrest of the front seat, or further struck against and break the wind shield and thrown away out of the car through the broken wind shield. This would be due partly to an insufficient strength of the hinge fitting and partly to an insufficient engagement between the locking members deriving from the application of an excessive load to the backrest.

SUMMARY OF THE INVENTION

It is, therefore, an object of the present invention to provide a hinge fitting for seats which is capable of withstanding considerable large loads satisfactorily.

Another object of the present invention is to provide a hinge fitting for seats which provide sufficient locking engagement between the locking members restrain disengagement due to collisions with the seat.

Still another object of the present invention is to provide a hinge fitting for seats of which the components are assembled with a relatively high accuracy.

A further object of the present invention is to provide a hinge fitting for seats which is easy and economical to assemble and mass-produce.

Briefly, a hinge fitting for seats having an adjustable backrest according to the present invention comprises a first and a second hinge member adapted to be secured to one side of the seat and backrest, respectively, and a pivot shaft for pivotably connecting the hinge members to each other.

Locking means is provided for locking the hinge members in a fixed position at different angles to each other, the locking means including a first and a second locking member normally meshing with each other in a plane, the first locking member being integral with one of the hinge members and having end teeth which are arranged in an arc of a circle having its center coincident with the axis of the pivot shaft, the second locking member having teeth adapted to be meshed with the first locking member for locking said one of the hinge members to the other of the hinge members in any desired angular position and disengaged from the first locking member for allowng said one of the hinge member to pivot around the pivot shaft.

Actuating means supports thereon the second locking member pivotably at a first pivot point and is supported pivotably at a second pivot point on said other of the first and second hinge members for actuating the second locking member into and out of locking engagement with the first locking member. A manually operated control lever is supported pivotally on the pivot shaft for driving the actuating means so as to disengage the second locking member from the first locking member when the control lever is operated, the control lever being normally biased so as to cause the actuating means to engage the first and second locking members.

Restraining means is provided which is overlapped with said other of the first and second hinge members in spaced relationship thereto and holding therebetween at least the first and second locking members for restraining the first and second locking members from being at least partly disengaged from each other in one direction or the other perpendicular to the plane in which the locking members mesh with each other.

A plurality of fastening pins rigidly secures the restraining means to said other of the first and second hinge members in the spaced relationship thereto, the plurality of fastening pins extending between the restraining means and said other of the first and second hinge members and having opposite ends connected by riveting to the restraining means and said other of the first and second hinge members, respectively. Thus the hinge fitting according to the present invention involves therein no resultant deformations which would be produced by the use of welding techniques: the hinge fitting and their respective components maintain the same dimensional accuracies as designed originally thereby to bring about smooth operation of the hinge fitting.

The pivot shaft may have a non-circular section portion easily received nonrotatably in a complementary bore provided in said one of the first and second hinge members. Thus, this brings about an easy assembly of the hinge fittings.

Other features and advantages of the present invention will become more clearly apparent from the following detailed description in combination with the accompanying drawings.

DETAILED DESCRIPTION OF AN EMBODIMENT OF THE INVENTION

Figure 1:
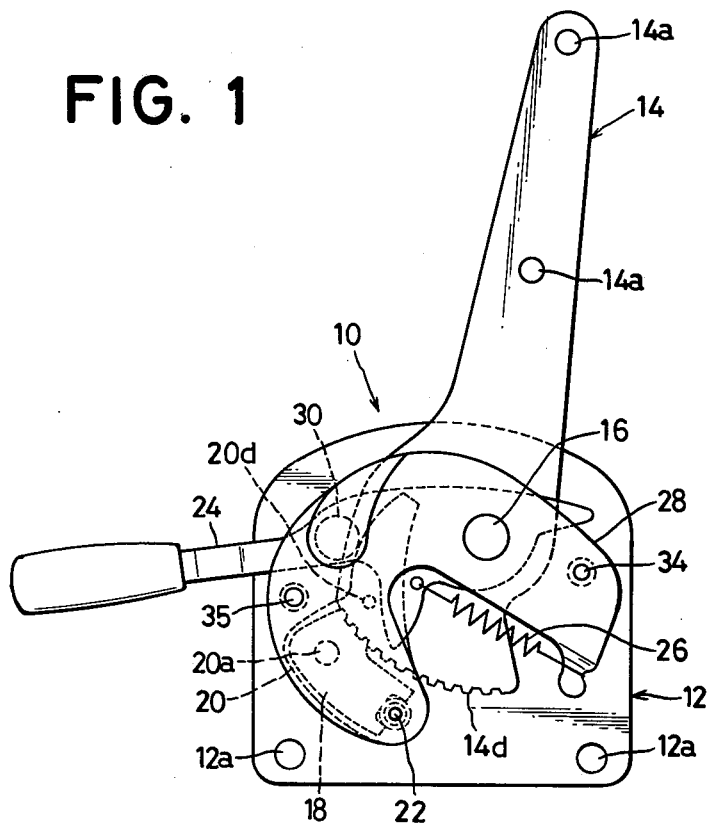
FIG. 1 shows a side view of an hinge fitting according to the present invention, showing the backrest seat in an available position.
Figure 2:
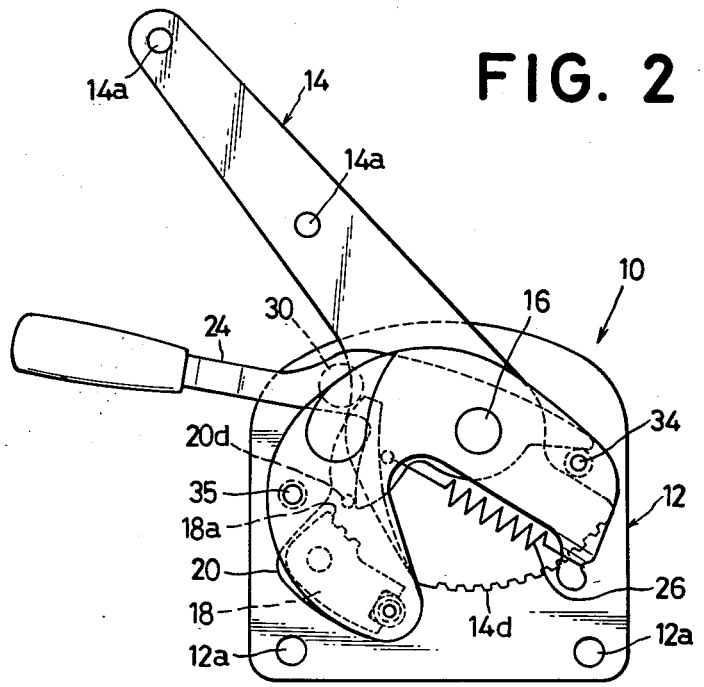
FIG. 2 shows a view similar to FIG. 1 of the hinge fitting, showing the backrest fully pivoted forward.
Figure 3:
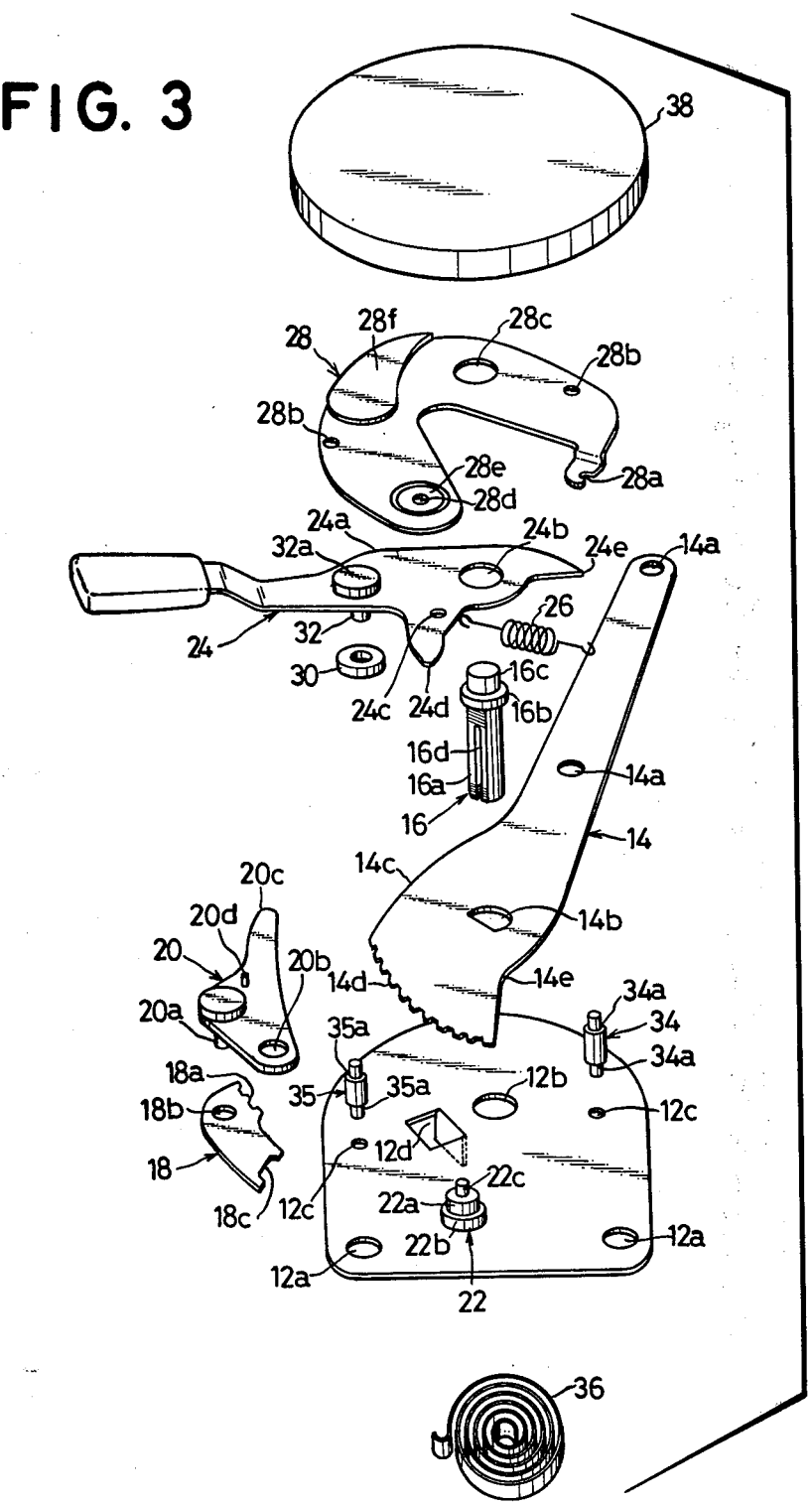
FIG. 3 shows an opened-out view of the hinge fitting.

Referring to FIGS. 1 to 3 of the drawings, there is shown a preferred embodiment of a hinge fitting according to the present invention for seats having adjustable backrest (not shown) and indicated generally by reference numeral 10. The hinge fitting comprises a lower hinge member 12 which is to be secured to one side of the seat as by screw fasteners (not shown) inserted in bores 12a in the hinge member 12 and an upper hinge member 14 which is to be secured to the same side of the backrest as by screw fasteners (not shown) inserted in bores 14a in the hinge member 14. The hinge members 12 and 14 are shown as being made of a metal plate. The upper hinge member 14 is pivotably connected to the lower hinge member 12 by means of a pivot shaft 16. The shaft has a non-circular sectional portion, i.e. a flat side surface portion 16a non-rotatably received in a complementary bore 14b provided in the upper hinge member 14, and rotatably received in a circular bore 12b in the lower hinge member 12. The shaft 16 has a circumferential flange 16b serving as a stop of the pivot shaft 16 inserted in the bore 14b in the upper hinge member 14. The shaft flange 16b has a thickness substantially equal to that of an actuating member to be described hereinafter in more detail, in order to permit a manually operated control lever, which will also be described hereinafter in more detail, to pivot steadily and smoothly over a surface of the actuating member.

Locking means includes a locking member 14c integral with the upper hinge member 14. The locking member 14c has end teeth 14d arranged in an arc of a circle having its center coincident with the axis of the pivot shaft 16. For example, it may take the form of a sector wheel having its pivot point coincident with the axis of the pivot shaft 16. It has a lateral recess 14e for limiting the counterclockwise movement thereof around the pivot shaft 16 to be described hereinafter in more detail. The locking member 14c may be a separate piece adapted to be rigidly secured to the upper hinge member 14.

Another locking member 18 constituting the locking means, having teeth 18a meshable with the locking member 14c, is supported pivotally at a pin 20a secured to one corner of an actuating member 20 and extending downwardly through a bore 18b in the locking member 18, as seen in FIG. 3. The actuating member 20 is supported pivotally at an intermediate diameter portion 22a of a pivot pin 22 secured at one end to the lower hinge member 12 by riveting and extending through bore 20b in the actuating member 20. The reason why the locking member 18 is mounted pivotally on the actuating member 20 is that the lower locking member 18 should be properly meshed with the upper locking member 14c, irrespective of a small error in the position where the pivot pin 22 is secured to the lower hinge member 12. The locking member 18 has a bifurcate end 18c loosely receiving a larger diameter portion 22b of the pin 22 in order to limit the pivoting movement of the locking member 18 around the pin 20a. Both the locking members 14c and 18 are made of a metal plate in the particular embodiment.

A manually operated control lever 24, having a plate-like body 24a, is supported pivotally by the upper end portion 16c of the pivot shaft 16, at its flange 16b, which extends upwardly through a bore 24b in the lever, as seen in FIG. 3. It is biased counterclockwise as seen in FIG. 1 by means of a return spring having opposite ends hooked in a hole 24c in the lever 24 and in a hook groove 28a in a restraining member 28, respectively, to be described hereinafter in more detail. The control lever 24 has a roller 30 supported rotatably by a pin 32 secured to the lever. The roller 30 is adapted to be normally in frictional rolling engagement with a driven arm portion 20c of the actuating member 20. The control lever 24 has a lateral protrusion 24d which serves to disengage the lower locking member 18 from the sector wheel 14c by pushing, counterclockwise as seen in FIG. 1, a driven pin 20d rigidly secured to the actuating member 20 when the control lever is operated. The lever 24 also has an axial protrusion 24e for limiting the counterclockwise movement thereof around the pivot shaft 16 to be described hereinafter in more detail.

The restraining member 28, plate-like and substantially U-shaped, pivotally receives the upper end portion 16c of the pivot shaft 16 in a bore 28c therein on the body 24a of the control lever 24, as seen from FIG. 3. It is secured to the lower hinge member 12 in spaced relationship thereto by means of a plurality of fastening pins 34 and 35 and a smaller diameter portion 22c of the pivot pin 22. In this case, the pins 34 and 35 have opposite shouldered ends 34a and 35a extending through corresponding bores 12c in the lower hinge member 12 and through correspondng bores 28b in the restraining member 28 respectively and connected by riveting to the lower hinge member and the restraining member, respectively. The fastening pin 34 further functions to stop at its position the counterclockwise and clockwise movements of the upper hinge member 14 and the control lever 24, respectively, around the pivot shaft 16 by engaging with the lateral recess 14e in the upper hinge member 14 and the axial protrusion 24e of the control lever 24, respectively. The fastening pin 35 further functions to stop at its position the counterclockwise movement of the control lever 24 around the pivot shaft 16 by engaging with the lever. The smaller diameter portion 22c of the pivot pin 22 extends through a bore 28d in the restraining member 28 and connected thereto by riveting. The bore 28d in the restraining member 28 is provided in a downward conical protrusion (not shown) formed in the other surface of the restraining member 28 by pressing a circular area 28e downwardly, as seen in FIG. 3. The conical protrusion has a protruding length equal to the thickness of the plate-like body 24a of the control lever 24 thereby to fill the clearance space which would otherwise be formed between the upper surface of the actuating member 20 and the lower surface of the restraining member when the restraining member is properly positioned and assembled with the associated members. The restraining member 28 has, in the other surface of its raised portion 28f, as seen in FIG. 3, an arcuate groove formed by pressing, which receives therein and guides the head 32a of the pin 32 when the control lever is operated or returned.

The restraining member 28 cooperates with the lower hinge member 12 to hold therebetween the upper hinge member 14, the locking members 14c and 18, the actuating member 20 and the control lever 24 with no backlashes among adjacent components in the direction perpendicular to the restraining member 28 and the lower hinge member 12 thereby to restrain the components, in particularly the upper and lower locking members, from being at least partly displaced and disengaged from each other in one direction or the other of the axis of the pivot shaft 16: i.e., in one direction or the other perpendicular to the plane in which the lower and upper locking members are disposed and meshed with each other. The restraining members 28 and the lower hinge member 12 have an overlapping extent large enough to cover therein the lower locking member 18, the actuating member 20 and the greater part of the body 24a of the control lever 24, and the area in which both the locking members will mesh with each other.

A coil spring 36 is located on the other surface of the lower hinge member 12 coaxially with the pivot shaft 16 and has one end held in a slit 16d in the pivot shaft 16 and the other end engaged with a hook 12d formed at the second hinge member 12, as seen from FIG. 3, thereby to bias the upper hinge member 14 counterclockwise as seen in FIG. 1. A dust cover 38, having an extent substantially equal to that of the lower hinge member 12, may be mounted in suitable well-known manners on the lower hinge member, covering the area in which the components are stacked and assembled.

In operation, the upper and lower locking hinge member 14c and 18 are normally meshed with each other thereby to lock the upper and lower hinge members 14 and 12 at a desired angle. If the inclination of the backrest is to be adjusted, for example, from the position as shown in FIG. 1, the control lever 24 is to be sufficiently pulled clockwise, as seen in FIG. 1. This will cause the roller 30 on the lever 24 to be moved away from the arm portion 20c of the actuating member 20 and then cause the lateral protrusion 24d of the lever 24 to push the pin 20d and pivot the actuating member 20 around the pin 22 counterclockwise, as seen in FIG. 1, thereby to disengage the lower locking member 18 from the sector wheel 14c, as seen in FIG. 3. Thus the upper hinge member 14 and therefore the backrest can be pivoted counterclockwise, as seen in FIG. 1, by the action of the coil spring 26. Under these conditions, if the backrest is adjusted to a desired angle of inclination and then the control lever 24 is returned to its original position, the actuating member 20 will be pivoted clockwise by the roller 30 clockwise pushing the arm portion 20c of the actuating member 20. This will cause the lower locking member 18 to be engaged with the sector wheel 14c in desired angular relationship thereto thereby to lock the upper hinge member 14 to the lower hinge member 12 at a corresponding angle.

If a relatively large force such as will pivot the backrest forwardly or backwardly due to sharp collisions with other vehicles, for example, should be applied to the backrest, a component of the force would exert on the roller 30 through the lower locking member 18 and the actuating member 20 thereby to act to bend the control lever 24 in the direction of the thickness of the lever in the vicinity of the roller 30. This would act to bring about an insufficient locking engagement between the locking members.

Although the actuating member 20 is supported pivotably at the pin 22 and pressed against by the roller 30, a component of the force mentioned above would exert on the pin 20a which is spaced from the pin 22 and the roller 30 thereby to press the actuating member 20 so as to disengage the upper and lower locking members 14 and 12 at least partly from each other in one direction or the other of the axis of the pivot shaft 16: in one direction or the other perpendicular to the plane in which the upper and lower locking members 14 and 12 are disposed and meshed with each other.

However, the restraining member 28 cooperates with the lower hinge member 12 in such a manner that the upper hinge member 14, the lower and upper locking members 12 and 14 and the control lever 24 are disposed in the axial direction of the shaft 16 with no axial back-lashes among the components 12, 18, 20 and 28, and among the components 12, 14, 24 and 28, respectively, whereby the components would not be able to move in either direction of the axis of the pivot shaft 16. Thus, the upper and lower locking members 14c and 18 would never be disengaged from each other. Further, the restraining member 28 and the lower hinge member 12 have their respective extents large enough to cover therewithin substantially the whole body 24a of the control lever 24, the roller 32, the lower locking member 18 and the actuating member 20. Thus, the control lever 24 would not be bent in one direction or on the other of the thickness thereof, thereby bringing about increased strength of the hinge fitting.

It is to be understood that modifications and variations of the embodiment of the present invention disclosed herein may be resorted without departing from the spirit of the invention and the scope of the appended claims.

What is claimed is:

1. A hinge fitting for a seat having an adjustable backrest, comprising, in combination:

a first and a second hinge member adapted to be secured to one side of the seat and the backrest, respectively;

a pivot shaft for pivotably connecting said hinge members to each other, locking means for locking said hinge members in a fixed position at different angles relative to each other, said locking means including a first and a second locking member normally meshing with each other in a plane, said first locking member being integral with one of said hinge members and having end teeth arranged in an arc of a circle which has its center coincident with the axis of said pivot shaft, said second locking member having teeth adapted to be meshed with said first locking member for locking said one of said hinge members to the other of said hinge members in any desired angular position and disengaged from said first locking member for allowing said one of said hinge members to pivot around said pivot shaft;

actuating means supporting thereon said second locking member pivoting at a first pivot point and supported pivotably at a second pivot point on said other of said first and second hinge members for actuating said second locking member into and out of locking engagement with said first locking member, said actuating means comprising a driven pin secured thereon and a driven arm portion;

a manually operated control lever pivotally supported on said pivot shaft for driving said actuating means to disengage said second locking member from said first locking member, said control lever being normally biased so as to cause said actuating means to engage said first and second locking members, a roller rotatably supported on said control lever for pushing said driven arm portion and therefore said actuating means thereby to engage said first and second locking members when said control lever is normally biased;

restraining means overalapped onto said other of said hinge members in spaced relationship thereto and holding therebetween said locking members, said actuating means, and said control lever for restraining said locking members, said actuating means and said control lever from being disengaged or displaced at least partly from each other in one direction or the other perpendicular to the plane in which said locking members mesh with each other; and said restraining means and said other of said hinge members having an overlapping extent large enough to prevent said control lever from being bent in the vicinity of said roller in the direction of the thickness of said control lever;

said restraining means having a conical protrusion which extends to an adjacent surface of said actuating means to fill a clearance space otherwise formed between said actuating means and said restaining means.

2. A hinge fitting according to claim 1, including:

a plurality of fastening pins rigidly securing said restraining means to said other of said first and second hinge members in the spaced relationship thereto, said plurality of fastening pins extending between said restraining means and said other of said first and second hinge members and having opposite ends connected by riveting to said restraining means and said other of said first and second hinge members, respectively.

3. A hinge fitting according to claim 2, wherein one of said hinge members is provided with a bore, and said pivot shaft has a non-circular section portion complementary to said bore and is received nonrotatably in said bore.

4. A hinge fitting according to claim 3, including:

a pivot pin at said second pivot point for pivotally supporting said actuating means at said second pivot point, said pivot pin having opposite ends connected by riveting to said restraining means and said other of said hinge members, respectively; and, said second locking member having a bifurcate end loosely receiving said pivot pin for limiting the pivoting movement of said second locking member arond said pivot pin;

said control lever having a substantially uniform thickness, said control lever having a lateral protrusion for pushing said driven pin and therefore said actuating means thereby to disengage said second locking member from said first locking member when said control lever is operated.

5. A hinge member according to claim 1, wherein said restraining means is a substantially plate-like and U-shaped member; and, said hinge fitting includes a return spring extending between said control lever and the end of one branch of said U-shaped member for obtaining the normal biasing of said control lever.

6. A hinge fitting according to claim 1, wherein said pivot shaft has a flat side surface, said second hinge member having a complementary bore provided with a surface complementary to said pivot shaft, said first hinge member having a circular bore, and said pivot shaft being received in said bores, nonrotatably in said complementary bore and rotatably in said circular bore.

7. A hinge fitting according to claim 6, including:

a pivot pin at said second pivot point, said pivot pin having a small, an intermediate and a large diameter portion, said actuating means being pivotally supported on said intermediate diameter portion, said pivot pin having opposite ends connected by riveting to said restraining means and said other of said hinge members, respectively; and, said second locking member having a bifurcate end loosely receiving the large diameter portion of said pivot pin for limiting the pivoting movement of said second locking member around said pivot pin;

said control lever having a plate-like body with substantially uniform thickness and provided with a bore for receiving said pivot shaft, said control lever having a lateral protrusion for pushing said driven pin and therefore said actuating means thereby to disengage said second locking member from said first locking member when said control lever is operated.

8. A hinge fitting according to claim 7, including:

a plurality of fastening pins rigidly securing said restraining means to said other of said first and second hinge members in the spaced relationship thereto, and wherein said plurality of fastening pins extend between said restraining means and said other of said first and second hinge members and have opposite ends connected by riveting to said restraining means and said other of said first and second hinge members, respectively.

9. A hinge member according to claim 7, wherein said restraining means is a substantially plate-like and U-shaped member and has a raised surface on one face provided with an arcuate groove for receiving and guiding the control lever pin; and said hinge fitting includes a return spring extending between said control lever and the end of one branch of the U-shaped plate for obtaining the normal biasing of said control lever.

* * * * *

UNITED STATES PATENT AND TRADEMARK OFFICE
CERTIFICATE OF CORRECTION

PATENT NO. : 4,148,525
DATED       : April 10, 1979
INVENTOR(S) : Chusaku Yamanashi It is certified that error appears in the above-identified patent and that said Letters Patent are hereby corrected as shown below:

Col. 1, Line 30  after "members" insert --to--

Col. 3, Line 44  after "spring" insert --26--

Col. 7, Line 17  "arond" should be --around--

Signed and Sealed this

Twenty-fifth Day of September 1979

[SEAL]

Attest:

Attesting Officer

LUTRELLE F. PARKER
Acting Commissioner of Patents and Trademarks